United States Patent [19]

Beltrami

[11] Patent Number: 5,808,263

[45] Date of Patent: Sep. 15, 1998

[54] METHOD AND APPARATUS FOR ELECTROEROSIVE MACHINING

[75] Inventor: Ivano Beltrami, Cavigliano, Switzerland

[73] Assignee: AGIE SA, Losone, Switzerland

[21] Appl. No.: 827,736

[22] Filed: Apr. 10, 1997

[30] Foreign Application Priority Data

Apr. 10, 1996 [DE] Germany ............... 196 14 134.6

[51] Int. Cl.$^6$ .................................................. B23H 7/06
[52] U.S. Cl. ...................................................... 219/69.12
[58] Field of Search ........................... 219/69.12, 69.17

[56] References Cited

U.S. PATENT DOCUMENTS

| | | | |
|---|---|---|---|
| 4,499,359 | 2/1985 | Obara | 219/69.12 |
| 4,520,253 | 5/1985 | Gamo et al. | 219/69.12 |
| 5,057,662 | 10/1991 | Beltrami et al. | 219/69.12 |
| 5,233,147 | 8/1993 | Magara | 219/69.12 |

FOREIGN PATENT DOCUMENTS

| | | |
|---|---|---|
| 0 084 735 A1 | 8/1983 | European Pat. Off. . |
| 0 312 056 | 10/1988 | European Pat. Off. . |
| 0 068 027 | 6/1989 | European Pat. Off. . |
| 27 48 454 A1 | 5/1978 | Germany . |
| 3609709 A1 | 10/1986 | Germany . |
| 43 10 126 A1 | 10/1994 | Germany . |
| 61-219529 | 9/1986 | Japan .................. 219/69.12 |
| 657 533 A5 | 9/1986 | Switzerland . |

OTHER PUBLICATIONS

Prof. Dr.–Ing. Dr. h.c. W. König et al, *Einfluβ der auf den Draht wirkenden Kräfte Konturgenauigkeit beim funkenerosiven Schneiden*, Industrie anzeiger, Nr.104 v 29. 12/ 1982/ 104.

Primary Examiner—Geoffrey S. Evans
Attorney, Agent, or Firm—Darby & Darby

[57] ABSTRACT

A method and apparatus for moving guide heads, possibly of a workpiece, of a wire erosion machine along in each case a wire guide path (TD) in which connection, by a cutting wire (1) traveling between the guide heads, a contour is cut into the workpiece (5) and the actual drag error (S) produced by the bulging of the cutting wire (1) is compensated for in the manner that the existing wire guide path (TD) is corrected with reference to a contour to be cut which is represented by at least one contour curve (UK), characterized by the fact that, for the correction of the existing wire guide path (TD), a drag error correction vector $(\vec{S_B})$ is calculated, its amount $(|\vec{S_B}(t)|)$ being calculated from the instantaneous erosion parameters forming the basis of the erosion and its direction, in particular the angle ($\alpha(x)$) between the calculated drag error correction vector $(\vec{S_B})$ and the tangent to a point x of the contour curve (UK), being calculated from the instantaneous erosion parameters forming the basis of the erosion and/or from the geometry of the contour to be cut.

24 Claims, 5 Drawing Sheets

METHOD AND APPARATUS FOR ELECTROEROSIVE MACHINING

BACKGROUND OF THE INVENTION

1. Field of the Invention

The present invention relates to a wire erosion machine with means for compensating for the so-called drag error.

Spark erosion or electroeorsion is a phenomenon which takes place upon electric discharge between two electrodes via a dielectric and serves to remove material from the one electrode. This principle has been known for a long time and is being used to an increasing extent for the machining of metal, since very precise contours can be produced with it. In corresponding machine tools, the so-called spark erosion machines, the one electrode is formed by the workpiece and the other electrode by a tool—a so-called tool electrode. For the production of the contour desired in each case, a corresponding, generally numerically controlled, relative movement is provided between the workpiece and the tool electrode. A flushing agent, ordinarily water, which flows around the erosion zone with a given adjustable flushing pressure, serves as dielectric between the two electrodes.

In a wire erosion machine a cutting wire which is continuously unwound from a wire supply is used as tool electrode. It travels over a first wire guide above the workpiece to the erosion zone and from there is pulled over a second wire guide below the workpiece into a place of deposit or disposal. For the cutting of a predetermined contour in the workpiece a precisely controlled relative movement between the cutting wire and the workpiece is required, which, as a rule is obtained by numerically controlled movement of the workpiece and/or of the guide heads which bear the wire guides. This relative movement must see to it that the erosion zone in the workpiece moves along a path—the contour curve—which follows as precisely as possible the contour to be produced.

In the ideal case, when the cutting wire travels precisely linearly between upper and lower wire guides, the relative movement between wire guide heads and workpiece should in the case of a cylindrical cut for instance, precisely follow said contour curve. Although the wire is mechanically tensioned in the guide heads by driving and braking rollers, it is unavoidable that the cutting wire will bulge out opposite the direction of cutting, due in particular to the flushing pressure and the erosion pressure in the erosion zone. This bulging causes problems upon changes in direction of the contour to be cut onto the workpiece, especially in the case of sharp curvatures or corners in the contour curve where then the so-called "drag error" manifests itself, tending to flatten the curvature and round-off the corners. This phenomenon is roughly comparable to the error between the traces of a towing vehicle and a towed vehicle which can be noted upon passage around narrow curves.

2. Description of the Related Art

Various measures are known in order to compensate for the drag error. Thus, for instance, U.S. Pat. No. 4,546,227 and the above-mentioned EP 0 068 027 B1 disclose different methods in which the bulge of the wire is measured during an interruption in the erosion process and from the measured values obtained control amounts are calculated which control the above-mentioned relative movement in the sense of minimizing the effects of the drag error. U.S. Pat. No. 4,546,227 discloses a method in which, for the cutting of a corner, the relative movement between the cutting wire and the workpiece is temporarily stopped and the drag error measured. EP 0 068 027 B1 discloses a method in which two correction values are calculated from the measured bulge of the wire, the one value referring to the tangential component of the drag error and the other value to the radial component of the drag error, they being used to correct the relative movement of the feed system introduced in accordance with the contour to be cut in the sense of compensation for the drag error. In other words, the path of the relative movement between the wire guide head and the workpiece which is actually brought about by the feeding system is displaced as a function of the measured values of the wire position with respect to the contour curve to be cut.

Each of these two methods has different disadvantages so that they cannot be employed universally. Thus, for instance, the above-mentioned first method, which effects a corner strategy by the reduction of the erosion parameters is very time-consuming. Depending on the radial portion of the workpiece, the average cutting rate is reduced hereby. Thus, for instance, in the case of a workpiece with 15% radial portion, only half of the maximum cutting rate is obtained. In the second method mentioned above, no reduction in the speed of erosion is necessary in view of the continuous correction of the drag error, so that the maximum cutting rate is equal to the average rate.

On the other hand, the breaking down of the drag error vector on a circular arc into the tangential and radial components is static and independent of the direction of the drag error in the origin of the path element. Upon return to a straight cut as well as upon transfer from one straight cut to another straight cut, no correction is provided any longer. Particularly in the case of small radii and large changes in direction, this static calculation fails.

From EP 0 312 056, a "sensor-supported" measuring device for measuring the deflection of the wire electrode is known. With it, the relative position between the guide heads of the wire electrode and the workpiece can be so corrected that machining errors caused by deflection of the wire are avoided. This method has certain limitations which must be taken into account by the operator. Particularly under severe operating conditions when, for instance, the contour to be cut comes too close to the edge of the workpiece, or contains cutting tracks which come too close, the measurement of the deflection can be unstable.

In an article by W. König and H, Hensgen "Konturgenauigkeit beim funkenerosiven Schneiden (Contour precision upon spark-erosive cutting)" in Industrieanzeiger, No. 104 of Dec. 29, 182, Vol. 104, pages 39–41, it is proposed that the programmed path be modified in the region of sharp corners or small radii taking into account the electric values, namely erosion current and erosion voltage, in order to reduce the drag error. In that article, however, only a relationship between a change in the electric values and a frontal displacement of the wire is mentioned. The article, however, gives no suggestion with regard to a correction of the path.

SUMMARY OF THE INVENTION

The present invention is based on the technical problem of improving the correction of the drag error in wire erosion machines. This problem associated with drag errors are solved according to the present invention.

Accordingly, a wire erosion machine is provided with a cutting were acting as erosion electrode which is guided between two guide heads, a setting device for effecting movements of the guide heads, possibly a workpiece, along in each case a wire guide path in such a manner that a contour can be cut into the workpiece, and a first device, such as a calculator-processor, which is so developed that it compensates for the actual drag error produced by the bulge of the cutting wire by correcting the corresponding wire guide path with respect to a contour to be cut which is represented by at least one contour curve, the first device, the calculator-processor, being so designed that it calculates a drag error correction vector for correcting the corresponding wire guide path, it calculating the amount thereof from the instantaneous erosion parameters upon the erosion and the direction of it, particularly the angle between the calculated drag error correction vector and the tangent to a point of the contour curve, from the instantaneous erosion parameters forming the basis of the erosion and/or from the geometry of the contour to be cut.

Further, there is provided a method for moving guide heads, for instance of a workpiece, of a wire erosion machine along in each case one wire guide path, a contour being cut in the workpiece by means of a cutting wire extending between the guide heads, and the actual drag error which results from the bulging of the cutting wire being compensated for in the manner that the corresponding wire guide path is corrected with respect to a contour to be cut which is represented by at least one contour curve, in which connection for the correcting of the corresponding wire guide path, a drag error correction vector is calculated, its amount being calculated from the instantaneous erosion parameters of the erosion and its direction, in particular the angle between the calculated drag error correction vector and the tangent to a point of the contour curve, being calculated from the instantaneous erosion parameters which form the basis of the erosion and/or from the geometry of the contour to be cut.

By erosion parameters there are understood here all the parameters which physically affect the removal of material in the erosion slot.

The object of the invention makes possible a new dynamic "software-supported" drag error correction which is a complete and universal solution and is therefore independent of the operating conditions.

Advantageous embodiments and development of the wire erosion machine of the invention and of the method of the invention are set forth in the dependent claims.

The invention is based on the discovery that the shift of the wire guide path which is to be traveled over by the setting device of the wire erosion machine with respect to the contour curve to be cut which is necessary for the correction of the drag error actually present can be represented by the amount and direction of a drag error correction vector, and that these two components can be calculated from the instantaneous erosion parameters and from the previously known geometry of the contour to be cut.

The amount of the vector is preferably calculated from the instantaneous operating current and the instantaneous operating voltage and from the instantaneous pressure of the flushing flowing around the cutting wire (the flushing pressure), while the direction of the vector is calculated from the angle which is present between the direction of the drag error at the end of a path element of the contour curve and the direction of the path element of the contour curve which is to be cut next. The arithmetic formulas to be employed here contain, in addition to the said values, only parameters which depend on fixed parameters of the machine and known parameters of the workpiece and can be determined in advance experimentally or arithmetically from these parameters and introduced in preparation for the machining of the workpiece, for instance introduced in the software for the computerized numerical control (CNC) of the wire erosion machine.

The first device in accordance with the invention can be used independently. Preferably, however, it is also installed in the wire machine in common with one or more other devices in order to activate it only when the other devices arrive at the limit of their possibility of use in the prevailing situation or have more disadvantages than advantages. Furthermore, the first device can serve to support a sensor-supported measuring device where experience shows this is necessary.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

In the following description, a terminology is used which serves for an easier reading of the specification but is not to be understood in a restrictive sense. For instance, expressions such as "top" and "bottom", "vertical", etc. refer to wire erosion machines in their customary working position and size, and to work pieces arranged in customary manner. The scales of the figures are to be understood as merely illustrative.

Figure 1:
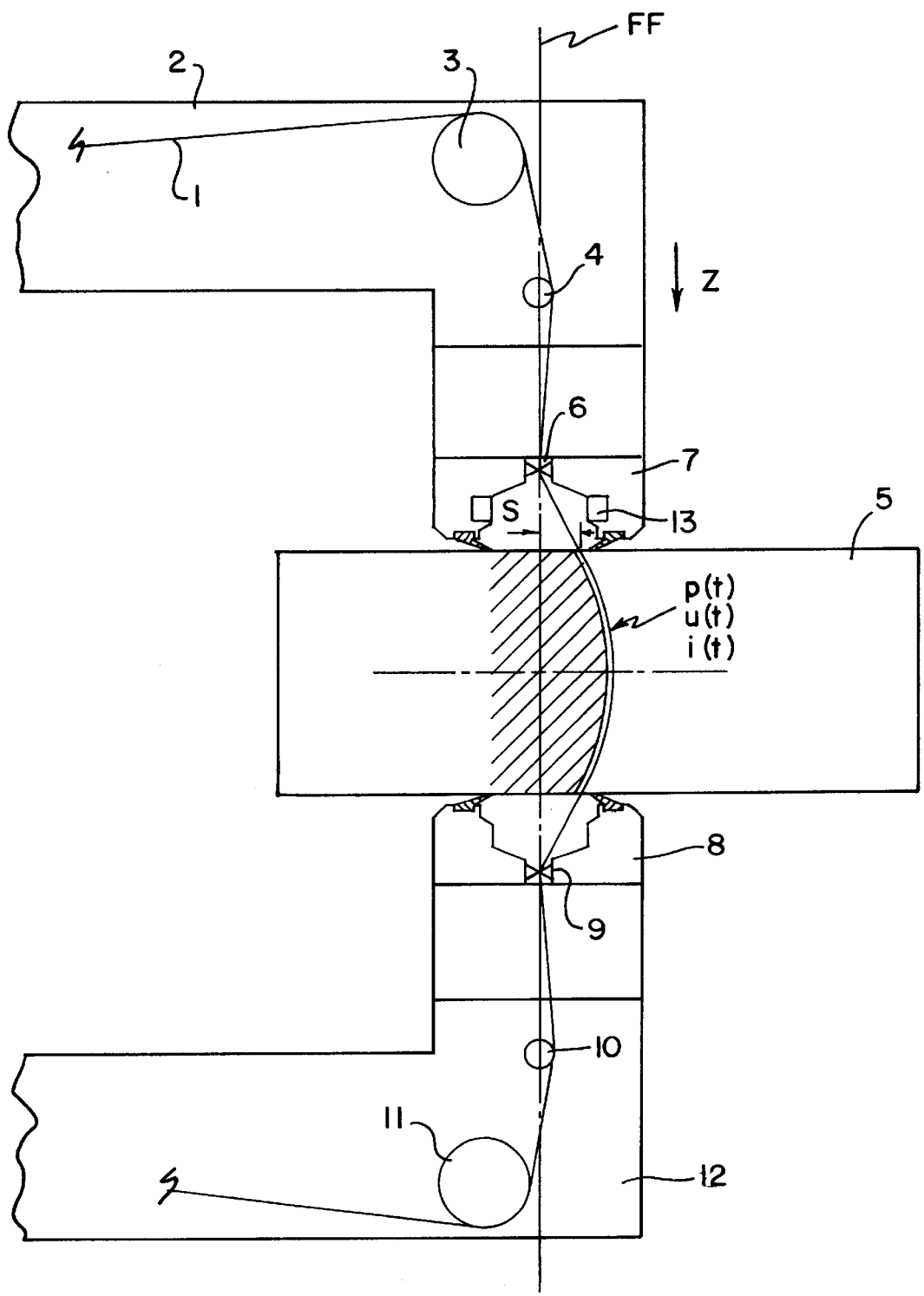
FIG. 1 is a diagrammatic view of the construction of a wire erosion machine.

FIG. 1 is limited to a purely diagrammatic showing of those parts of a wire erosion machine which are worth mentioning for an explanation of the invention. Basic elements such as flushing system and generator are not shown, since they are considered to be self-evident and generally known.

An eroding or cutting wire 1 charged with electric pulses upon the erosive cutting is wound forward from top to bottom in the direction of transport of the wire indicated by an arrow Z. The cutting wire 1 which is unwound from a supply roll (not shown) first of all passes over a few deflections of an upper machine arm 2, of which only one guide pulley 3 is shown. The cutting wire 1 then passes over a current feed 4, which in customary manner serves for applying the electric pulses given off by the generator of the machine. The current feed 4 also effects a certain pretensioning of the cutting wire 1. Behind the current feed 4 as seen in the direction of advance Z and above a workpiece to be cut there is an upper wire guide 6 which is located in an upper guide head 7. As alternative (not shown) several upper wire guides can be provided instead of a single upper wire guide 6.

Behind or under the workpiece 5 there is a second guide head 8 in which a further lower wire guide 9 is arranged. Again, as alternative (not shown), several lower guide wires can be provided instead of a single lower wire guide 9. After passing through the workpiece 5, the cutting wire 1 first of all passes through the lower wire guide 9 before it is fed, around a lower current feed 10 which corresponds to the upper current feed 4 and a guide pulley 11, which is fastened on a lower machine arm 12, to a disposal container (not shown). A flushing device (not shown) sees to it that the cutting wire 1 is continuously moved around coaxially under pressure by a flushing agent in the workpiece 5.

Ordinarily the workpiece 5 and/or the lower guide head 8 is guided two-dimensionally (in so-called X- and Y-directions) along a wire guide path in order to cut a specific contour out of the workpiece 5. In order to obtain a conical cut, the upper guide head 7 is generally guided in U- and V-directions relative to the lower guide head 4 and the workpiece 5. In particular, in special wire erosion machines, the lower guide head 8 is not movable while the workpiece 5 and the upper guide head 7 are movable independently of each other. The following embodiment describes a wire erosion machine with guided upper and lower guide heads and stationary workpiece. In the description of the embodiment, therefore other known methods for the guiding or swinging of the individual guide heads 7 and 8, of the workpiece 5, etc., are not further indicated in connection with the drag error correction of the invention, which however is not to be understood in a restrictive sense, but is intended only to serve for the clarity of the description. The drag error correction to be applied in each case can be applied in corresponding manner by analogy to all these methods with due consideration of the basic geometry.

Figure 2:
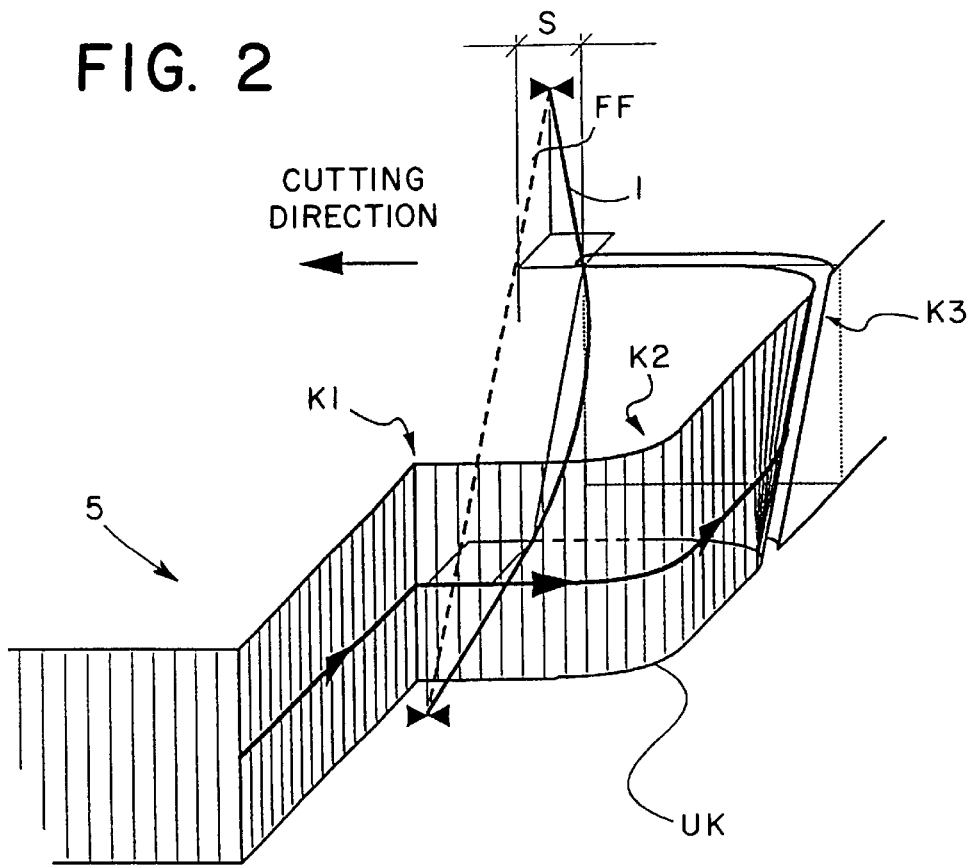
FIG. 2 is a perspective view of a workpiece and of the cutting wire during the machining.

As described above, upon the electroerosive cutting of full cuts, the cutting wire 1 is bent out or bulged opposite to the direction of cutting. Upon trimming, a bulging-out perpendicular to the direction of cutting can also take place. Bulging perpendicular to the direction of cutting is shown in FIG. 1 for the case that the direction of cutting is from right to left in the plane of the drawing. In this case, the cutting wire 1 therefore bulges out towards the right. The width S of the bulge is defined here as the distance between the actual position of the wire at the entrance into and the exit from the workpiece and a wire guide line FF which connects the points of application of the cutting wire 1 against the wire guides 9 and 9 to each other. The width S also designates the drag error which actually occurs FIG. 2 shows an example for a cut produced on the workpiece 5. The cutting wire 1 is shown in a position in which it has already passed through several sections of the cut. The first section is cut cylindrically and extends up to a an edge or corner K1. The second section extends from there further to a curve K2 and is also cut cylindrically. The third section extends further to a curve K3 with conical cut surface and itself changes its conism from a cylindrical cut to a conical cut. All sections with the exception of the conical sections are directed vertically, i.e. their generatrices, which are shown as thin hatch lines in FIG. 2, extend vertically through the workpiece 1. In the conically cut curve K3, the generatrices extend oblique to the vertical.

A heavy line with arrows which extends centrally through the generatrices in FIG. 2 designates the direction of cutting.

Upon the cylindrical cut, the desired contour would ideally result—if the cutting wire 1 had no bulge but corresponded precisely to the wire guide line FF—if the guide heads would be guided along a wire guide path in X- and Y-directions which correspond precisely to a contour curve UK of the contour to be cut on the surface of the workpiece. Upon the conical cut, independently of the additional U- and V- relative movements of the upper guide head 7 with respect to the lower guide head 8, the wire guide path of the lower guide head 7 differs from the contour curve UK of the contour to be cut on the lower workpiece surface.

Because of the unavoidable bulging of the wire, the wire guide line FF is not located at the place of the actual erosion zone but at a distance away equal to the width S of the bulge. This leads, particularly in the case of corners and curves of the contour, to the drag errors described above. In order to compensate for this drag error, the wire guide path must be so corrected that the wire is always on the desired contour and therefore in accordance with the formula:

$$\vec{F}(x) = \vec{F_0}(x) + \vec{S_B}(x) \quad (1)$$

Herein:

$\vec{F}(x)$ is the corrected position of the guide heads (wire guide path), $\vec{F_0}(x)$ is the original, desired contour, and $\vec{S_B}(x)$ is the calculated drag error correction vector.

In formula (1), $\vec{F}(x)$, $\vec{F_0}(x)$ and $\vec{S}(x)$ designate vector values as a function of the locus x. Formula (1) can, however, also be formulated as a function of the time t.

The possibility of calculating both the amount of the drag error correction vector and the direction of the drag error correction vector as a function of the real erosion conditions and correcting the positions of the guide heads in real time in accordance with Formula (1) is particularly advantageous.

The value S(t), i.e. the drag error actually found as a function of the time t, can generally be viewed in the manner that it always—and therefore not only in the case of straight cuts but also in the case of corners and curves—indicates the distance which must be maintained between the corrected wire guide path TD and the instantaneous erosion zone along the contour curve UK. At every time t, a drag error correction vector $\vec{S_B}(t)$ can furthermore be indicated the instantaneous amount of which $|\vec{S_B}(t)|$ corresponds in each case to the width S(t) and the instantaneous direction of which, starting from a point on the contour curve UK, points to the corresponding point of the corrected wire feed path TD. By means of this vector $\vec{S_B}(t)$, one thus obtains all information for determining the corrected wire guide path TD from the contour curve UK.

Figure 3:
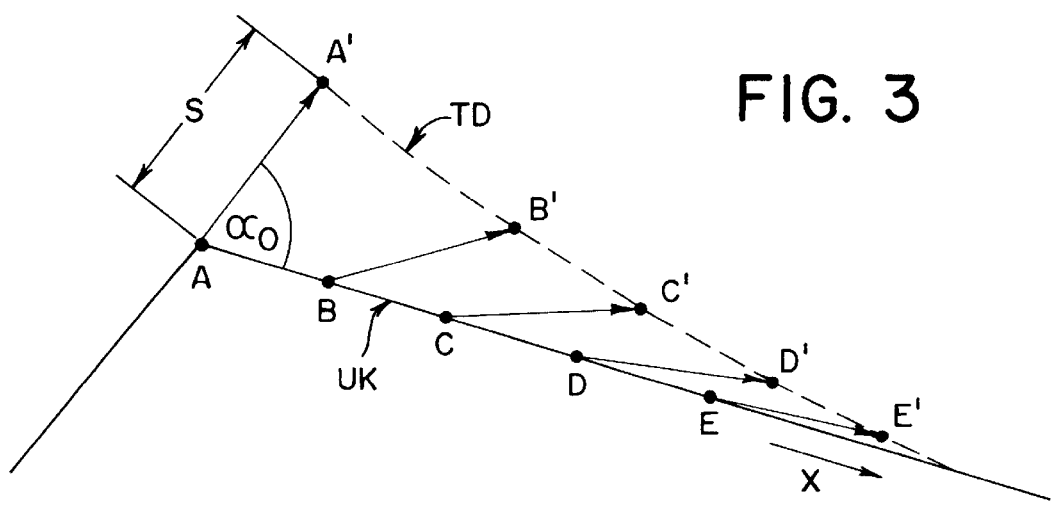
FIG. 3 shows the change in the drag error correction vector upon the cutting of an edge.

FIG. 3 shows this situation as first example upon the cylindrical cutting of a corner. The contour curve UK of the contour to be cut on the surface of the workpiece is shown in heavy line. If a cylindrical cut without drag error were possible, the contour curve UK would correspond to the wire guide path of the guide heads 7, 8. Upon the (unavoidable) occurrence of the drag error, the wire guide path TD must be corrected in corresponding fashion. The guide heads 7, 8 should, because of the bulge S of the cutting wire 1 upon the cutting of the linear section in front of the corner A leave the place of the erosion zone in each case by the length S in cutting direction along the corrected wire guide path TD. It has been found that the length S depends substantially linearly on the power invested in the erosion, and therefore on the instantaneous value of the operating current—i.e. the instantaneous arithmetic average of the current flowing in the erosion zone—the instantaneous value of the erosion voltage, the pressure from the gas bubble which forms around the plasma channel, hereinafter referred to as the erosion pressure, the flushing pressure, as well as parameters which do not vary at all during the operation or are predictable in advance(wire diameter, type of wire, height of workpiece, type of material, etc.). A series of corresponding technological measurements can establish with the required precision all relationships between the length S and the wire erosion machine, the workpiece 5, possibly the contour and the surrounding conditions This means that during each operation it is possible to calculate the value S immediately (for instance, every millisecond) and only with the aid of the signals which indicate the instantaneous operating current, the instantaneous operating voltage of the erosion and the flushing pressure. A formula found for this which indicates the amount of the calculated instantaneous value $|\vec{S_B(t)}|$ accurately is:

$$|\vec{S_B(t)}| = a*i(t) + b*p(t) + p(t) + c*u(t) = d \quad (2)$$

in which the symbol * stands for multiplication, i(t) is the instantaneous value of the operating current, u(t) is the instantaneous value of the operating voltage, and p(t) is the instantaneous pressure of the flushing; a, b, c, and d are factors which depend essentially on the above-mentioned fixed or predeterminable parameters and are substantially constant during an erosion process. These factors can be predetermined experimentally and/or at least determined partially arithmetically from said parameters and be entered, in preparation for the machining of the workpiece into the computer of the numerical control (CNC) of the wire erosion machine.

The contour to be cut, which is shown in FIG. 3, or more precisely the desired contour curve UK forms a corner at which the direction of the cut changes abruptly by an angle $\alpha_0$. At the moment that the corner A is reached, the wire guide or guides is or are at the point A' of the wire guide path TD. The vector A–A' has, as described above, the value S and forms the angle $\alpha_0$ with the direction cutting towards the corner. This angle $\alpha_0$ is predetermined by the geometry of the contour curve to be cut. In order to continue the next cut in accordance with the contour curve UK over the points A, B, C, etc. which lie on a straight line, the vector is gradually turned from the old direction of cutting into the new direction, in principle without changing its amount $|\vec{S(t)}|$. This means that the angle $\alpha(x)$ which the vector forms with the new direction of cutting decreases with increasing length x of the new cut. In this way, the wire guide path TD follows the points A', B' C', etc. It has been found that the vector angle $\alpha(x)$ decreases exponentially with respect to the position of the new straight cutting lines, namely in accordance with the formula:

$$\alpha(x) = \alpha_0 * \exp(-x/x_0) \quad (3)$$

in which $x_0$ is the "half-value distance" of the rotation of the drag error vector, i.e. the distance in which the drag error vector effects half the change in direction. The "half-value distance" depends essentially on fixed parameters of the machine. The fact of the exponential decrease of the angle $\alpha(x)$ confirms that the friction caused by the curvature of the cutting wire is proportional to the change in speed of the direction of the vector.

The parameter $x_0$ can, in the same way as the above-mentioned constants a, b, c and d, be determined experimentally or established arithmetically from fixed parameters of the machine and introduced into a memory 50 of the device. In the event of a large $\alpha_0$, i.e. with a large change in direction of the contour to be cut, the value of $x_0$ furthermore shows a certain dependence on $\alpha_0$, in particular as a result of the fact that the curvature of the wire opposes a certain resistance to a change in direction of the cut. This dependence can also be determined in advance and be introduced into the software of the device.

Figure 3A:
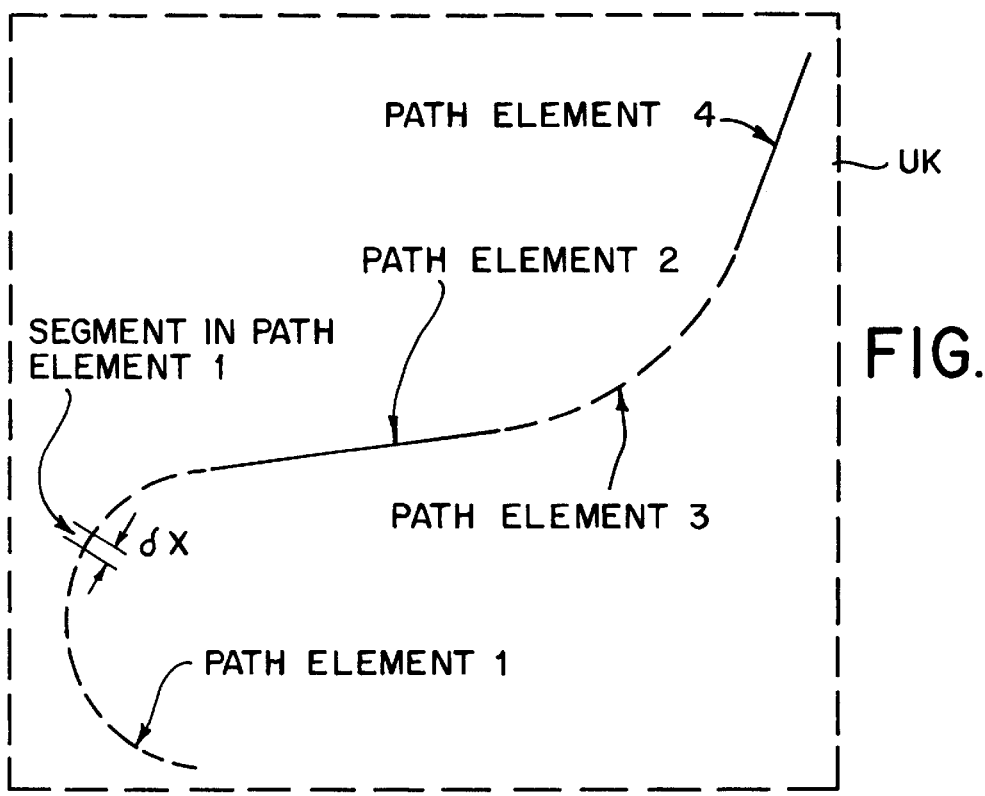
FIG. 3a shows a diagrammatic division into path elements and segments of the contour curve which is to be cut.

From the differential equation $$d\alpha/dx = -\alpha_0/x_0 * \exp(-x/x_0) \quad (4)$$

it can be noted that upon the dividing of a path element to be cut, as shown in FIG. 3a, into segments of a length $\delta x$, the change in direction of the vector for each segment can be calculated in accordance with the following formula:

$$\delta\alpha(x) = -\alpha(x)/x_0 * \delta x \quad (5)$$

Figure 3B:
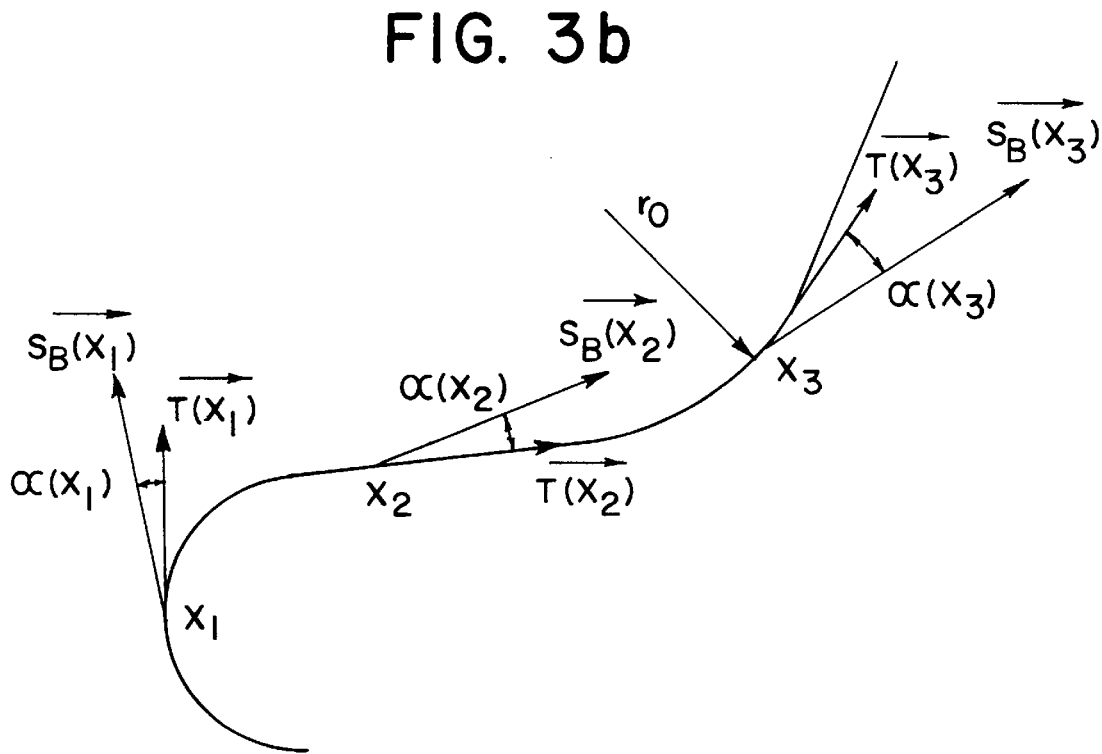
FIG. 3b shows tangents and drag error correction vectors on a contour curve which is to be cut.

By formula (5) the change in direction or "rotation" of the vector is calculated for each path section $\delta x$. This algorithm can easily be generalized on every contour curve UK by taking into account the instantaneous curvature $1/r_0(x)$ of the contour curve at point x. $\alpha(x)$ in this case is the angle between the vector at the point x and the direction of cutting which is given by the tangent at the point x, as shown in FIG. 3b. For the calculation of the change in angle $\delta\alpha(x)$, a new term is added which describes the rotation of the tangent over the distance $\delta x$, namely $\delta x/r_0(x)$. Thus the general form of formula (5) becomes $$\delta\alpha(x) = (\pm 1/r_0(x) - \alpha(x)/x_0) * \delta x \quad (6)$$

in which the "+" sign is to be used if the contour curve moves away from the instantaneous direction of the drag error and the "−" in the opposite case.

The integrating of formula (6) for individual constants $r_0$ and $x_0$ supplies the generalized form of formula (3) for the event that the contour curve is a sequence of circular arcs (a straight line is an arc in which $r_0=\infty$), which is practically always the case in an actual contour curve. One then obtains $$\alpha(x) = \alpha_0 + (\alpha_0 - \alpha_\infty) * \exp(-x/x_0), \quad (7)$$

in which $\alpha_0$ is the angle between the calculated drag error correction vector $\vec{S_B}$ and the tangent of the new cutting direction at the origin of a new path element (arc) and $\alpha_\infty$ is the asymptotic angle $\alpha$ which is obtained for $x \gg x_0$ if the arc is sufficiently long. In this steady-state case $\delta\alpha$ is equal to 0 and from formula (6) we obtain:

$$\alpha_\infty = x_0/r_0, \quad (8)$$

which is very useful for the determination of the parameter $x_0$.

The amount $|\vec{S_B}|$ of the drag error correction vector $\vec{S_B}$ is, as described above, in principle, independent of the geometry of the contour curve. A small correction is, however, necessary in the case of large changes in the cutting direction, and therefore for $\alpha_0 > 90°$, since under these circumstance the component of the change in direction of the drag error correction vector $\delta S_B$ along the last cutting direction is even negative. In order to avoid the wire eroding too far into the workpiece, it is necessary to reduce the amount $|\vec{S_B}|$ instantaneously in accordance with the following formula:

$$|\overrightarrow{S_B(x)}|=S_0*(1-f* \sin(g*x/x_0)*\exp(x/x_0)) \qquad (9)$$

Herein $S_0$ designates the amount of the drag error correction vector before the change in cutting direction. The parameters f and g are, among other things, dependent on the change in direction of cutting, the cutting speed, and possibly also the erosion parameters and the materials used.

Formula 9 describes an oscillation of the amount of the drag error which is noticeable (or measurable) only in the event of large changes in direction and decreases exponentially within the half-value distance $X_0$.

Figure 4:
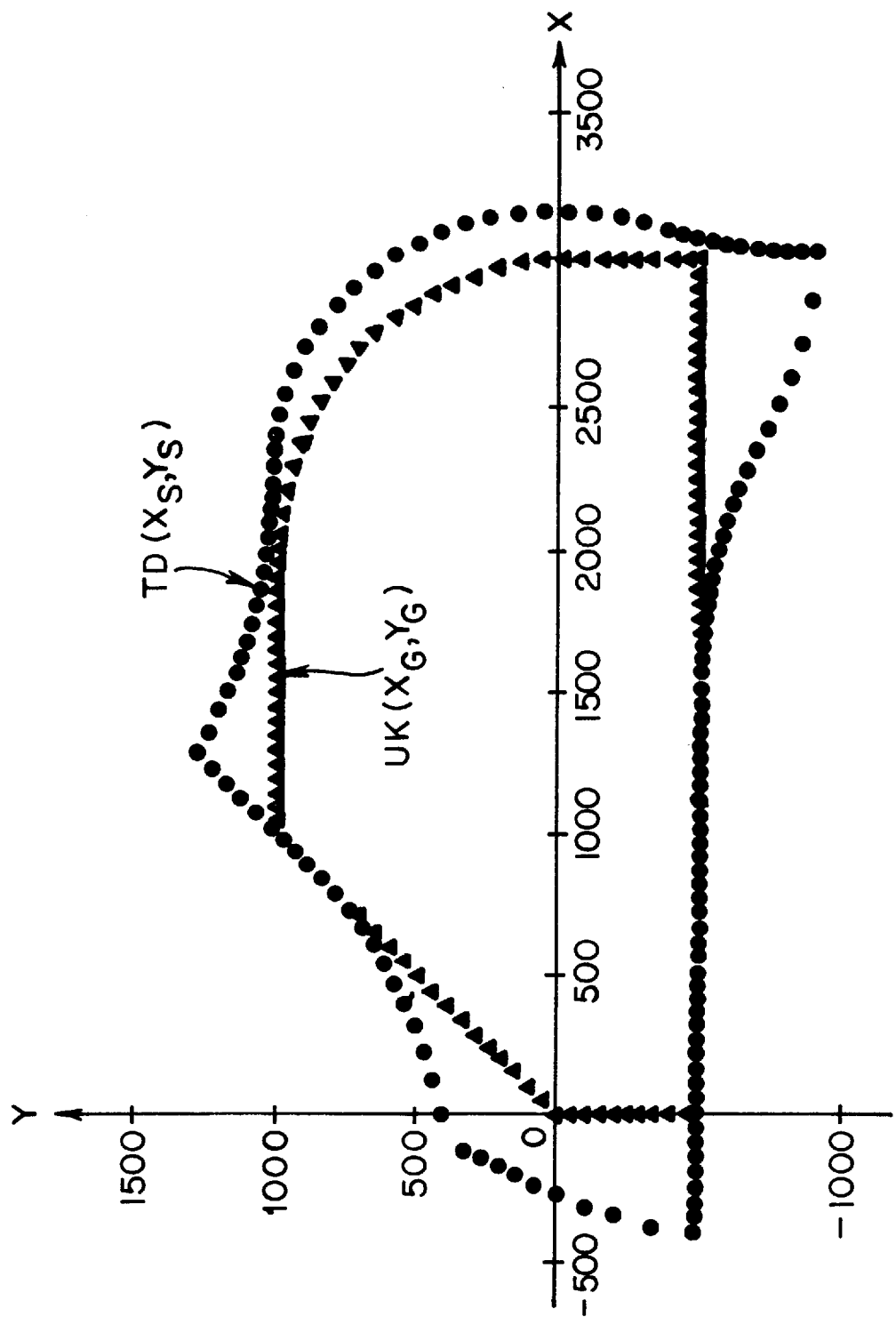
FIG. 4 shows a typical course of a wire guide path as compared with a contour curve to be cut, on basis of an example.

As second example, FIG. 4 shows the application of the above algorithm to a contour to be cut—represented by a contour curve UK—, in which connection the corner points on the contour curve UK indicate discrete points; the Cartesian coordinates of these points may be designated $x_G$ and $y_G$. The round points give discrete values along the corrected wire guide path TD, corresponding to the desired coordinates $X_s$ and $Y_s$ for a wire feed head or wire feed heads. The numbers indicated on the coordinate axes are measurements in $\mu$m. In the case shown, the amount of the drag error correction vector and of the actual drag error S is, as can be seen, 400 $\mu$m.

The method of the invention and the wire erosion machine of the invention can be used in practice for any contours, in particular also in the case of conical cuts. Upon a conical cut, the cutting wire 1, in addition to its inclination with respect to the vertical line extending through the workpiece 5 is generally inclined in the cutting direction due to the drag error. Thus, the cutting wire 1 in each case above and below the workpiece 5 is at a certain angle of inclination to the wire guide line FF. These two angles of inclination are correlated with the amount of the drag error above and below the workpiece and are substantially proportional to the cutting speed and the flushing pressure. Thus these angles of inclination or the drag errors below and above the workpiece 5 are in first approximation of the same size; however, in case of a greater relative speed of the two guide heads 7 and 8 with respect to each other, they may differ from each other by up to 15%. This difference can be corrected in second approximation by taking these relative speeds into consideration.

For each pair of coordinates $x_G$, $y_G$ of the contour curve UK, therefore, it is possible by the above-indicated method to calculate a corresponding pair of desired coordinates $X_s$, $y_s$ for the position of the lower guide head 8 and/or a corresponding pair of coordinates for the upper guide head 7. In accordance with this calculation, the setting device of the machine can then be controlled, with due consideration of the erosion parameters i(t), u(t) and p(t) at the time, without having to have recourse to the measured values of any wire position sensors.

Furthermore, the quality of this method rests on the completeness of the data bank with which the parameters described a, b, c, d, $x_0$, are determined as a function of the machine parameters (wire diameter, height of workpiece, etc.). A high-grade, highly automated erosion machine can intelligently combine the different methods, particularly sensor-supported and "software-supported" methods, in the sense that practically all disadvantages which are inherent in a method can be overcome by other methods. Although the different methods in themselves represent independent solutions, the combining of them makes it possible to eliminate all practical restrictions on their use.

The first device, the calculator-processor, can therefore preferably be installed in a wire erosion machine which contains still other devices for the determination of the drag error, in particular a second device, such as an electronic unit based on evaluating sensor measurements, the operation of which is based on the signals of one or more wire-position sensors. By suitable selection, it is then possible to optimize the machining of the workpiece 5 with respect to maximum reliability and maximum speed of machining. Furthermore, complex geometries with contour curves UK which are difficult to cut can be cut automatically with maximum reliability and precision without intervention by the operator.

If very severe erosion conditions arise within the contour to be eroded, for instance acute angles of less than 20°, the speed of cutting can furthermore be reduced for a short time, regardless of the method used: The drag error correction vector or its amount is immediately adapted in both cases.

In the following there will be described with reference to FIG. 5, an embodiment for a corresponding combination of two devices for the determination of the drag error, together with measures for the intelligent selection of the device to be used in each case, which selection can be made also without participation or intervention by the operator, with the advantage that the operator need not have any special know-how: He need essentially only determine the final geometry and the desired precision and roughness. This procedure is provided with the reference numeral 110 in the FIG. 5. The certainty of obtaining a desired final geometry in the desired form is definitely increased as compared with normal machining by the method based on two independent control members 20 and 30, namely calculation and measurement of a drag error correction vector $\overrightarrow{S_B}$ and $\overrightarrow{S_G}$. The numerical control 40 breaks the contour curve down into path elements (generally circular arcs) and prepares all necessary parameters by means of the data bank 50. The numerical control can employ a geometry-dependent adaptation of the desired speed if particularly difficult operating conditions occur, without it being necessary to change anything in the entire correction system. The correction system calculates or measures a new drag error correction vector accordingly. The corrected final geometry TD of the guide heads is calculated by an interpolator 70.

An increase in the reliability of operation and precision can be obtained by the introduction of a wire-position sensor 30. In that case, two methods or devices 20 and 30 are available for the correction of the drag error, they in themselves applying two similar drag error correction vectors $\overrightarrow{S_B}$ and $\overrightarrow{S_G}$.

The first device 20 receives the time-dependent erosion parameters i(t), u(t) and p(t) and contains calculating means which determine by algorithms in accordance with the above formulas, the amount and direction of the drag error correction vector $\overrightarrow{S_B}$. These values of the drag error correction vector are sent to a signal input of a selection device 60, symbolized by a switch. From an associated output of the selection device 60, the correction values are fed to an input of the interpolator 70 and combined there with coordinate values $x_G$, $y_G$ of the contour curve to be cut, in order to obtain corrected desired coordinates $x_s$, $y_s$ for the movable guide heads, movable by a setting device 90.

Figure 5:
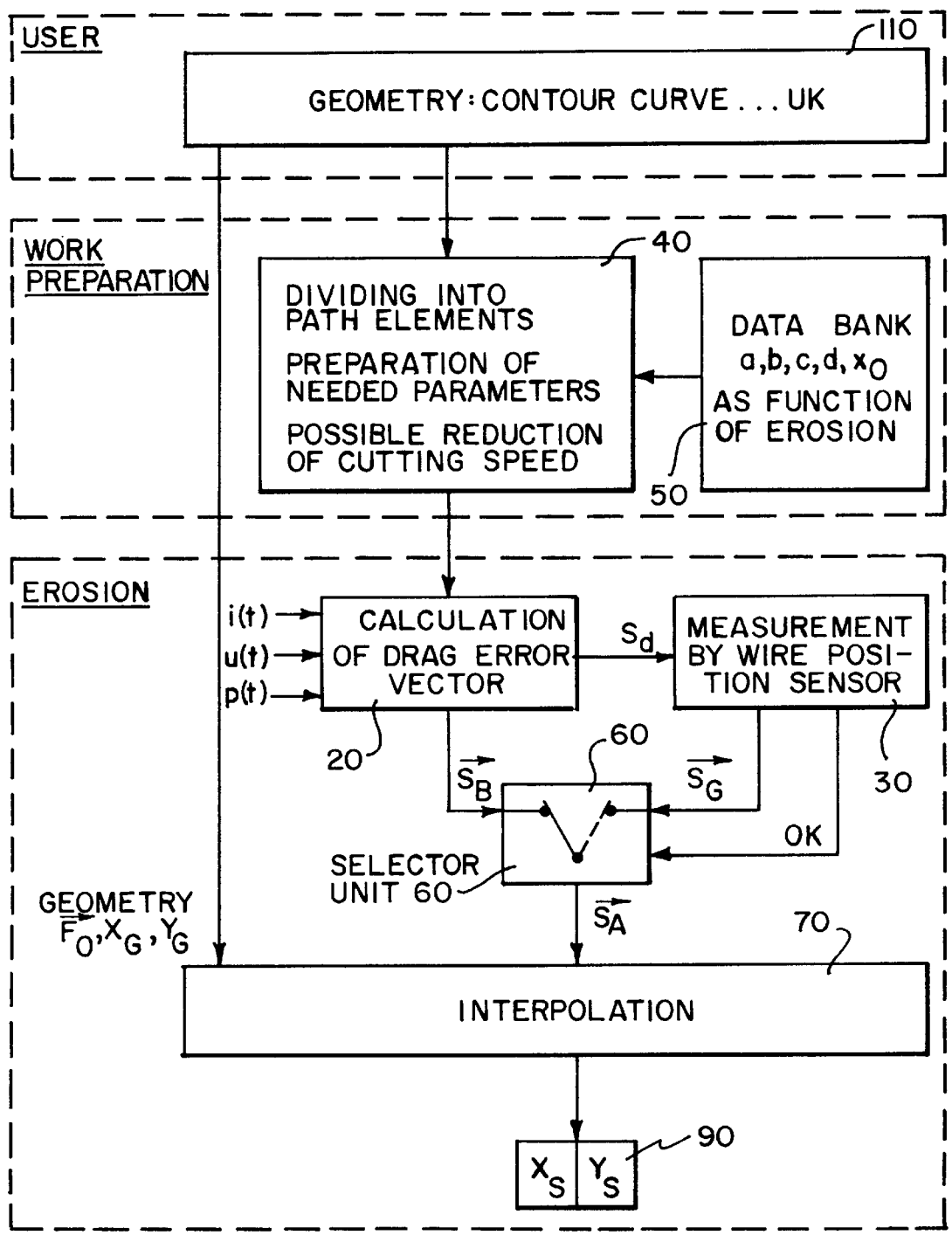
FIG. 5 is a block diagram of a control system which corrects the drag error in a wire erosion machine according to one embodiment of the invention.

In the embodiment shown in FIG. 5, there is provided in addition to the first device 20, the second device, the sensor unit 30 which receives at least one sensor $S_d$ of at least one wire position sensor which is indicated diagrammatically in FIG. 1 by the reference numeral 13. As wire-position sensor 13, a device such as disclosed in EP 0 312 056 A1 can for instance be used. The second device 30 determines the bulge of the cutting wire 1 from the sensor signal or signals $S_d$ and from this also derives corresponding values for a drag error correction vector $\vec{S_G}$. The drag error correction vector $\vec{S_G}$ supplied by the second device 30 can, alternatively or together with the drag error correction vector $S_B$ supplied by the first device 20, be fed via the selection device 60 to the interpolator 70 where it is processed in similar manner to that described above in connection with the first device 20. If $\vec{S_G}$ and $\vec{S_B}$ are fed jointly to the interpolator 70, the latter can derive an average correction value for instance by averaging or by similar methods.

One possible procedure for the final determination of the corrected wire feed path TD is as follows:

Assuming that the measurement conditions are optimal and the accuracy of the measurement sufficient, the path is corrected with the drag error correction vector $\vec{}_G$ from measurement by wire-position sensor 30.

At the same time, the first device 20 calculates the drag error correction vector $\vec{S_B}$ by means of the instantaneous values i(t), u(t), p(t).

If the difference between the two signals $\Delta S = S_G - S_B$ exceeds a given value, the speed of cutting is reduced.

The second device 30 monitors variations in the sensor signals, for instance by calculating the variance over a certain time span. If the variance exceeds a given value or is equal to 0, i.e. the wire-position sensor is not operating, the control 30 signals this defective situation to the selection device 60 which then goes over with a given algorithm to the use of the signal $S_B$.

As an alternative to this procedure, it is advantageous for certain machinings to use the drag error correction vector $\vec{S_B}$ as main signal and use $\vec{S_G}$ as additional sensor for monitoring possible vibrations of the wire.

The selection device 60 is to decide in real time what type of drag error detection or correction is the most meaningful, either the first, substantially sensor-independent drag error detection or correction by means of the first device 20, or the second sensor-supported drag detection or correction by means of the second device 30, or a combination of these two corrections. This decision should be made on the basis of several criteria, particularly the stability of the signal of the wire-position sensor 13 or of the second device 30, the process stability and the contour geometry.

For the detection of possible instabilities of the at least one sensor signal $S_d$, this signal is continuously monitored. The selection device 60 selects the drag error correction vector $\vec{S_B}$ supplied by the first device 20 if the sensor signal $S_d$ satisfies at least one of the following criteria:

1. The absolute value of the sensor signal $S_d$ is more or less than a predetermined limit value.
2. The oscillation of the sensor signal $S_d$—i.e. the vibration of the cutting wire 1—is greater or lesser by a predetermined limit amplitude, which can be determined for instance by means of the standard deviation or the variance of the sensor signal $S_d$.
3. The change of the sensor signal $S_d$ per unit of time exceeds a predetermined limit value.

The satisfying of the first and third criteria can indicate an undesired behavior of the wire-position sensor 13 so that the first device 30 must spring into action. The wire-position sensor 13 may, however, also not respond from the start. In order to take this case into account, the first device 20 is selected furthermore on basis of a fourth criterion:

4. In a test phase before the start of the erosion, any variation of the sensor signal $S_d$ is determined by increasing the flushing pressure (for instance, from 0 bar to 18 bar).

Signal variations of a wire-position sensor 13 are produced upon increase in pressure, for instance by a preceding malfunction of the wire erosion machine (collision) which damaged the sensor.

The functions of the devices 20 and 30 can be satisfied at least in part by a common computer or by separate processors, as well as the functions of the selection device 60 and the interpolator 70.

With the arrangement described, there is the possibility, during the machining of a workpiece, to change the nature of the determination of the drag error and thus also to change the drag error correction. The change from one device 20, 30 the other (for instance from the second device 30 to the first device 20 or vice versa) takes place with transitions with lie within the given contour tolerance of the corresponding cut.

Two embodiments of how the wire-erosion machine can be operated with a change between two different types of drag error detection are described below:

Example 1: Software-Supported Correction

The selection device 60 passes the calculated drag error correction vector $S_B$ to the interpolator 70. The wire-position sensor or the second device 30 is used to monitor the movement of the wire.

If the oscillation of the wire (standard deviation of the sensor signal $S_d$) exceeds a given value, or the difference between the two signals $$|\vec{\Delta S}| = |\vec{S_G} - \vec{S_B}|$$

exceeds a given value,
then the speed of cutting is reduces until the above-mentioned criteria are satisfied.

Example 2: Sensor-Supported Correction

The drag error correction vector $\vec{S_G}$ from measurement by wire-position sensor is used as main signal and forwarded by the selection device 60 to the interpolator.

If the oscillations of the wire (standard deviation of the sensor signal $S_d$) exceeds a given value, or the difference between the two signals $$|\vec{\Delta S}| = |\vec{S_G} - \vec{S_B}|$$

exceeds a given value,
then the control 50 signals this defective situation to the selection device 60, which then selects and applies a given algorithm for the use of the calculated drag error correction vector $\vec{S_B}$.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A wire erosion machine for controllably correcting a drag error of a wire guide path due to bulging of the wire while cutting a workpiece, comprising:
   a wire electrode;
   at least one controllably movable upper guide head;
   at least one upper wire guide associated with the at least one controllably movable upper guide head;
   at least one controllably movable lower guide head;
   at least one lower wire guide associated with the at least one controllably movable lower guide head;
   moving means for moving the at least one controllably movable upper guide head and the at least one controllably movable lower guide head along a wire guide path (TD) such that a contour being cut into a workpiece;
   a first calculator-processor operatively connected to the at least one controllably movable upper guide head and the at least one controllably movable lower guide head to compensate for the drag error (S) by correcting the actual wire guide-path (TD) in reference to a predetermined contour curve (UK) by determining a drag error correction vector $(\vec{S_B})$, by calculating
   an amount of a drag error correction vector $(|\vec{S_B(t)}|$ from actual erosion parameters; and
   a direction of the drag error correction vector angle $(\alpha(x))$ between the calculated drag error correction vector $(\vec{S_B})$ and a tangent to a point x of a contour curve (UK) from at least one of the actual erosion parameters and from a geometry of a predetermined contour curve.

2. The wire erosion machine according to claim 1, wherein at least one of calculating of the amount $(|S_B(t)|)$ and the direction $(\alpha(x))$ of the calculated drag error correction vector $(S_B)$ is based on at least one of erosion current (i(t)), erosion voltage (u(t)) and flushing pressure (p(t)).

3. The wire erosion machine according to claim 1, wherein the first calculator-processor calculates the amount $(|\vec{S_B(t)}|)$ of the calculated drag error correction vector $(\vec{S_B})$ from the actual operating current i(t), the instantaneous erosion voltage u(t), and the instantaneous flushing pressure p(t) in accordance with the simplified formula $$|\vec{S_B(t)}|=a*i(t)+b*p(t)+c*u(t)+d,$$

in which a, b, c and d are factors experimentally or arithmetically predeterminable from fixed parameters of the wire erosion machine and the workpieces.

4. The wire erosion machine according to claim 1, wherein the first calculator-processor divides the contour curve (UK) into segments of path elements and calculates the angle $\delta\alpha(x)$ for each segment of successive segments of length $\delta x$ in accordance with the formula:

$$\delta\alpha(x)=\pm 1/r_0-\alpha(x)/x_0*\delta x,$$

in which x is a running length of the next section to be cut, $x_0$ is a parameter predeterminable at least one of experimentally and arithmetically from fixed erosion parameters, and $1/r_0$ is a curvature of the contour curve, $r_0$ and $x_0$ being calculated upon passage from a previous path element to a present path element.

5. The wire erosion machine according to claim 1, wherein the first calculator-processor is designed such as when the contour curve (UK) is a sequence of circular arcs, the first calculator-processor calculates the angle $(\alpha(x))$ between the calculated drag error correction vector $(S_B)$ and the tangent at the point x of the contour curve (UK), according to the formula:

$$\alpha(x)=\alpha_0+(\alpha_0-\alpha_\infty)*\exp(-x/x_0)$$

in which $\alpha_0$ is the angle between the drag error correction vector $(\vec{S_B})$ and the tangent of the new cutting direction and $\alpha_\infty$ is the asymptotic angle which is reached for $x>>x_0$.

6. The wire erosion machine according to claim 5, wherein the first calculator-processor is designed to determine the parameter $X_0$ from the relationship $$\alpha_\infty=x_0/r_0.$$

7. The wire erosion machine according to claim 6, further comprising a sensor unit for determining a drag error correction vector $(\vec{S_G})$ from a measurement of the actual drag error (S), and a selector for selecting a drag error correction vector $(\vec{S_B}; \vec{S_G})$ determined by at least one of the first calculator-processor, a sensor unit and a combination of drag error correction vectors of at least one of the first calculator-processor and the sensor unit.

8. The wire erosion machine according to claim 7, wherein the sensor unit includes at least one sensor for determining the relative position of the wire with respect to the at least one upper and at least lower guide heads and for producing at least one corresponding sensor signal $(S_d)$.

9. The wire erosion machine according to claim 7, further comprising an interpolator communicatively connected with the selector and wherein the interpolator receives a selected drag error correction vector $(\vec{S_A})$ from the selector and under consideration of the geometry of the contour curve (UK), the interpolator determines the corrected path of the wire guides.

10. The wire erosion machine according to claim 9, further comprising a numerical control for reducing the cutting speed.

11. The wire erosion machine according to claim 10, wherein at least one of the first calculator-processor, the sensor unit, the selector and the interpolator are disposed within at least one computer.

12. The wire erosion machine according to claim 11, wherein the selector is communicatively connected to the sensor unit for switching upon receiving the drag error $(S_d)$ from the calculator-processor as soon as the sensor signal $(S_d)$ upon satisfying predetermined limit value of at least one of a standard deviation, a change per unit of time and an absolute value of the sensor signal $(S_d)$.

13. A method for moving an upper and a lower guide head in relation to a workpiece in a wire erosion machine along a wire guide-path (TD) while cutting the workpiece, comprising the steps of:
   a) cutting a contour into the work piece with a wire electrode;
   b) compensating for an actual drag error (S) produced by the bulging of the cutting wire (1) for correcting the wire guide-path (TD) by comparing to a predetermined contour curve (UK);
   c) calculating for the correction of the existing wire guide path (TD) a drag error correction vector $(\vec{S_B})$ by calculating the amount for $(|\vec{S_B(t)}|)$ from the actual erosion parameters and calculating at least one of a direction of the angle $(\alpha(x))$ between the calculated drag error correction vector $\overrightarrow{(S_B)}$ and the tangent to a point x of the contour curve (UK) from the actual erosion parameters and the geometry of the contour to be cut.

14. The method according to claim 13, wherein at least one of the amount ($|\overrightarrow{S_B(t)}|$) and the direction ($\alpha(x)$) of the calculated drag error correction vector $\overrightarrow{(S_B)}$ is calculated from the erosion parameters erosion current (i(t)), erosion voltage (u(t)) and/or flushing pressure (p(t)).

15. The method according to claim 13, wherein the amount ($|\overrightarrow{S_B(t)}|$) of the calculated drag error correction vector $\overrightarrow{(S_B)}$ is calculated from the instantaneous operating current i(t), the instantaneous erosion voltage u(t), and the instantaneous flushing pressure p(t) in accordance to the formula $$(|\overrightarrow{S_B(t)}|)=a*i(t)+b*p(t)+c*u(t)+d,$$

in which a, b, c and d are predetermined factors by one of experimental or arithmetical means from fixed parameters of the wire erosion machine and the workpiece.

16. The method according to claim 15, further providing the step of dividing the contour curve (UK) into segments of path elements and for each new segment of successive segments of the length δx the angle δα(x) is calculated in accordance with the formula:

$$\delta\alpha(x)=\pm 1/r_0-\alpha(x)/x_0*67\ x,$$

in which x is the length of the next section to be cut, $x_0$ is a parameter which can be predetermined experimentally or arithmetically from fixed parameters of the wire erosion machine, and $1/r_0$ is the curvature of the contour curve, $r_0$ and $x_0$ being calculated upon passage from the previous path element to the present path element.

17. The method according to claim 16, further providing the step of calculating the angle ($\alpha(x)$) between the calculated drag error correction vector $\overrightarrow{(S_B)}$ and the tangent at point x of the contour curve (UK) when the contour curve (UK) is a sequence of circular arcs, according to the formula:

$$\alpha(x)=\alpha_0+(\alpha_0-\alpha_\infty)*\exp(-x/x_0),$$

in which $\alpha_0$ is the angle between the drag error correction vector $\overrightarrow{(S_B)}$ and the tangent of the new cutting direction, and $\alpha_\infty$ is the asymptotic angle which is reached for x>>$x_0$.

18. The method according to claim 17, further providing the step of determining the parameter $x_0$ from the relationship $$\alpha_\infty=x_0/r_0.$$

19. The method according to claim 18, further comprising the steps of a) determining a drag error correction vector $\overrightarrow{(S_G)}$ by measuring the actual drag error (S) and
b) selecting at least one of a drag error correction vector $\overrightarrow{(S_B)}$, $\overrightarrow{S_G}$) and a combination of several drag error correction vectors $\overrightarrow{(S_B)}$; $\overrightarrow{S_G}$).

20. The method according to claim 19, further comprising the steps of determining the relative position of the cutting wire (1) with respect to the guide heads (7, 8) by measurement and producing at least one corresponding sensor signal ($S_d$).

21. The method according to claim 20, further providing the step of determining the corrected path of the upper and lower wire guides by means of at least one of the selected drag error correction vector $\overrightarrow{(S_B)}$; $\overrightarrow{S_G}$) and the selected combination of drag error correction vectors $\overrightarrow{(S_B)}$; $\overrightarrow{S_G}$) and the geometry of the contour curve (UK).

22. The method according to claim 21, further comprising the step of reducing the cutting speed upon predetermined operating conditions occur.

23. The method according to claim 20, further comprising the step of selecting the calculated drag error correction vector $\overrightarrow{(S_B)}$ when the sensor signal ($S_d$) satisfies reaching at least one of a predetermined limit value of standard deviation, of a change per unit of time, and of an absolute value of the sensor signal ($S_d$).

24. The method according to claim 20, wherein the workpiece is moved.

* * * * *